United States Patent
Anand et al.

(10) Patent No.: US 12,160,511 B2
(45) Date of Patent: Dec. 3, 2024

(54) KEY IMPORT WITH HYBRID CRYPTOGRAPHY

(71) Applicant: INTERNATIONAL BUSINESS MACHINES CORPORATION, Armonk, NY (US)

(72) Inventors: Vaijayanthimala K. Anand, Austin, TX (US); Jeffrey J. Feng, Round Rock, TX (US); Priti Bavaria, Austin, TX (US); Martin Schmatz, Rueschlikon (CH); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 17/657,193

(22) Filed: Mar. 30, 2022

(65) Prior Publication Data

US 2023/0318826 A1    Oct. 5, 2023

(51) Int. Cl.
*H04L 9/08* (2006.01)

(52) U.S. Cl.
CPC .................. *H04L 9/0897* (2013.01)

(58) Field of Classification Search
CPC ...................................... H04L 9/0897
See application file for complete search history.

(56) References Cited

U.S. PATENT DOCUMENTS

| | | | |
|---|---|---|---|
| 5,515,438 A | 5/1996 | Bennett | |
| 7,333,611 B1 | 2/2008 | Yuen | |
| 8,340,298 B2 | 12/2012 | Gelfond | |
| 8,379,862 B2* | 2/2013 | Gandhi | H04L 63/0428 713/192 |
| 8,566,913 B2* | 10/2013 | Arnold | H04L 9/088 713/193 |
| 8,755,527 B2* | 6/2014 | Arnold | H04L 9/0822 726/32 |
| 8,903,094 B2 | 12/2014 | Bovino | |
| 9,288,051 B2* | 3/2016 | Arnold | H04L 9/0897 |
| 9,306,745 B2* | 4/2016 | Arnold | H04L 9/0897 |
| 9,413,730 B1* | 8/2016 | Narayan | H04L 63/0471 |
| 9,509,506 B2 | 11/2016 | Hughes | |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Viral S Lakhia
(74) *Attorney, Agent, or Firm* — Scott S. Dobson

(57) ABSTRACT

Hybrid encryption of imported key material is provided. A request to import key material is received from a user system. In response to the request, two public keys are sent to the user system. The two public keys include a classical cryptography (CC) public key and a quantum-safe cryptography (QSC) public key. At least one public key of the two public keys is retrieved from a hardware security module (HSM). Hybrid-encrypted key material is received from the user system. The hybrid-encrypted key material is key material that has been encrypted using the two public keys. The key material, at least partially encrypted by the at least one public key, is sent to the HSM.

19 Claims, 7 Drawing Sheets

(56) References Cited

U.S. PATENT DOCUMENTS

| | | | |
|---|---|---|---|
| 10,229,270 B2* | 3/2019 | Campagna | H04L 63/067 |
| 10,348,500 B2* | 7/2019 | Harp | H04L 63/20 |
| 10,355,857 B2 | 7/2019 | Earl | |
| 10,361,852 B2 | 7/2019 | Kazin | |
| 10,425,401 B1* | 9/2019 | Pecen | H04L 63/0815 |
| 10,439,800 B2* | 10/2019 | Garcia-Morchon | H04L 9/008 |
| 10,511,436 B1* | 12/2019 | Machani | H04L 9/085 |
| 10,686,593 B2* | 6/2020 | Hamel | H04L 9/0894 |
| 10,742,420 B1 | 8/2020 | Griffin | |
| 10,951,423 B2* | 3/2021 | Garcia Morchon | H04L 9/0894 |
| 11,218,320 B2* | 1/2022 | Suresh | G09C 1/00 |
| 11,245,527 B2* | 2/2022 | Uy | H04L 63/08 |
| 11,329,811 B1* | 5/2022 | Russell | H04L 9/0869 |
| 11,362,835 B2* | 6/2022 | Sastry | H04L 9/3239 |
| 11,418,327 B2* | 8/2022 | Seaborn | H04L 9/083 |
| 11,522,686 B2* | 12/2022 | Peddada | H04L 9/0897 |
| 11,575,515 B2* | 2/2023 | Ghosh | G06F 8/71 |
| 11,784,798 B2* | 10/2023 | Gaddam | H04L 9/0822 |
| 11,824,972 B2* | 11/2023 | Pai | H04L 9/0897 |
| 2009/0003591 A1 | 1/2009 | Murakami | |
| 2016/0261408 A1* | 9/2016 | Peddada | H04L 9/0894 |
| 2017/0173262 A1* | 6/2017 | Veltz | G16H 20/17 |
| 2018/0167381 A1* | 6/2018 | Roth | H04L 9/0891 |
| 2021/0226951 A1* | 7/2021 | Goldstein | H04L 63/0884 |
| 2021/0289001 A1* | 9/2021 | Wilson | H04L 63/101 |
| 2022/0021530 A1* | 1/2022 | Kupwade Patil | H04L 9/0825 |
| 2022/0294617 A1* | 9/2022 | Parry | H04L 9/0855 |
| 2023/0020193 A1* | 1/2023 | Williams | H04L 9/0877 |
| 2023/0171100 A1* | 6/2023 | Eckardt | H04L 9/0897 713/171 |
| 2023/0186293 A1* | 6/2023 | Dolev | H04L 9/0869 705/75 |

OTHER PUBLICATIONS

"CYBER; Migration strategies and recommendations to Quantum Safe schemes", ETSI TR 103 619 V0.1.0, Jun. 2020, 21 pages.

Barker et al. "Exploring Challenges Associated with Adopting and Using Post-Quantum Cryptographic Algorithms", NIST Cybersecurity White Paper, Apr. 28, 2021, 10 pages.

Bindel et al. "Hybrid Key Encapsulation Mechanisms and Authenticated Key Exchange", Post-Quantum Cryptography, Jul. 14, 2019, 206-226.

International Searching Authority, "Notification of Transmittal of the International Search Report and the Written Opinion of the International Searching Authority, or Declaration," Patent Cooperation Treaty, Jun. 20, 2023, 13 pages, International Application No. PCT/EP2023/056218.

Paul et al., "Towards Post-Quantum Security for Cyber-Physical Systems: Intergrating PQC into Industrial M2M Communication", Computer Security—ESORICS 2020, Sep. 13, 2020, 30 pages.

Vogt et al., "How Quantum Computers threat security of PKIs and thus eIDs", Lecture Notes in Informatics, 2021, 12 pages.

* cited by examiner

KEY IMPORT WITH HYBRID CRYPTOGRAPHY

BACKGROUND

The present disclosure relates to key management services, and more specifically, to importing user keys into a key management service.

Key management services allow users to store encrypted data in cloud environments. Key management services use hardware security modules (HSMs) to securely store keys that are used to encrypt user data. Some key management services allow users to import their own cryptographic key material to use as a root key within the HSM.

SUMMARY

According to embodiments of the present disclosure, a method for key import is provided. The method includes receiving a request to import key material from a user system. In response to the request, two public keys are sent to the user system. The two public keys include a classical cryptography (CC) public key and a quantum-safe cryptography (QSC) public key. At least one public key of the two public keys is retrieved from a hardware security module (HSM). Hybrid-encrypted key material is received from the user system. The hybrid-encrypted key material is key material that has been encrypted using the two public keys. The key material, at least partially encrypted by the at least one public key, is sent to the HSM. Further embodiments provide a computer program product for performing the method.

According to further embodiments of the present disclosure, a system for key import is provided. The system includes a hardware security module (HSM) and a key import module. The key import module is configured to receive a request to import key material from a user system; send, in response to the request, two public keys to the user system, the two public keys including a classical cryptography (CC) public key and a quantum-safe cryptography (QSC) public key, where at least one public key of the two public keys is retrieved from the HSM; receive hybrid-encrypted key material from the user system, wherein the hybrid-encrypted key material is key material that has been encrypted using the two public keys; and send the key material, at least partially encrypted by the at least one public key, to the HSM.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
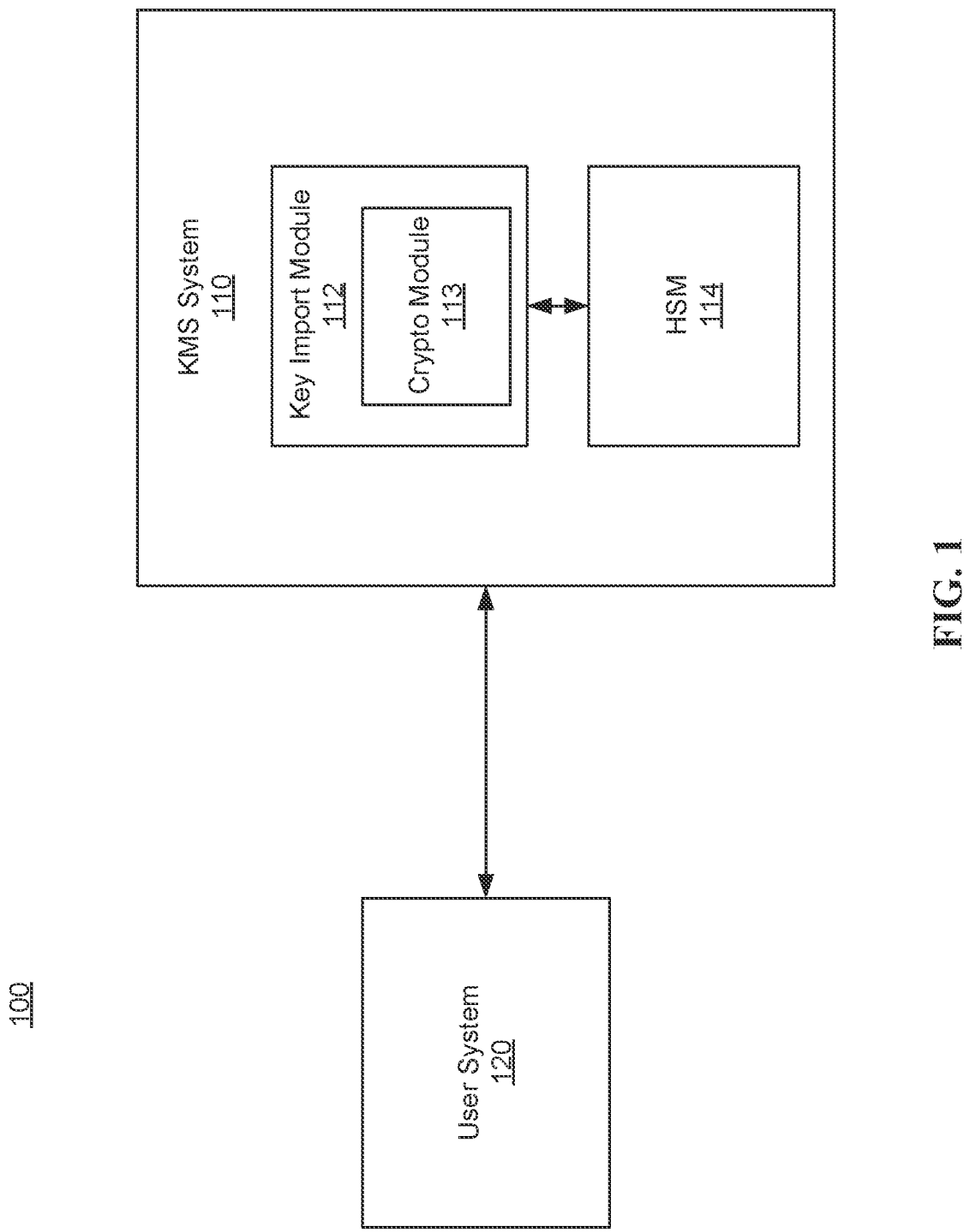
FIG. 1 depicts a block diagram of an example computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to importing keys into a key management service, and more particular aspects relate to hybrid post-quantum and classical cryptography for import of key material. While the present disclosure is not necessarily limited to such applications, various aspects of the disclosure may be appreciated through a discussion of various examples using this context.

With Shoe s algorithm, classical cryptography (CC) algorithms such as Rivest-Shamir-Adleman (RSA), Elliptic-curve cryptography (ECC), and Diffie Hellman are breakable by large quantum computers. While these large quantum computers are not available today, current data in-transit can be snooped and stored, and can be decrypted at a later date when large quantum computers become available. This vulnerable data in-transit content includes root of trust key materials that are imported into key management services. Root of trust key materials can be used to encrypt large amounts of data, so the impact of a breach of the root of trust can be far reaching. A root key may be a symmetric key-wrapping key that is used as a root of trust for encrypting and decrypting other keys that are stored in a key management service.

Embodiments of the present disclosure provide hybrid encryption for importing key materials into a hardware security module (HSM) of a key management service (KMS). The hybrid encryption includes encryption of the key material using both CC and quantum-safe cryptography (QSC) algorithms. In response to a request from a user to import key material, the KMS communicates a QSC public key and a CC public key to the user. The user encrypts the key material using both the QSC public key and the CC public key to produce hybrid-encrypted key material. The user sends the hybrid-encrypted key material to the KMS and the key material is decrypted and securely stored in the HSM of the KMS. The technical solutions provided herein may provide for import of key materials that is secure against future large quantum computers.

Pairs of CC and QSC keys may be created in either the KMS or the HSM according to different embodiments. When a key pair is generated within the HSM, the KMS may retrieve the public key from the HSM to communicate it to the user. In some embodiments, the HSM may generate the CC key pair and the KMS may generate the QSC key pair. Thus, embodiments of the present disclosure allow for the use of QSC for the import of key material, even when the HSM does not support QSC. If the HSM does support QSC, the CC key pair and/or the QSC key pair may be generated within the HSM.

The user device may encrypt the user's key material using the received public keys in various ways to perform hybrid encryption in different embodiments. In some embodiments, the entire key material is first encrypted with the CC public key and that encrypted material is completely encrypted with the QSC public key. In some embodiments, the key material is split into two parts and a first part is encrypted with the CC public key and the second part is encrypted with the QSC public key.

In addition to the key pairs, a nonce may be generated by the KMS and/or HSM. The nonce may be a random or pseudo-random number. These nonces may be communicated to the user along with the public keys. The user may return an encrypted nonce that has been encrypted using the user's key material using a symmetrical encryption algorithm. Alternatively, the nonce may be encrypted using the same hybrid cryptography used to encrypt the key material and send the encrypted nonces with the encrypted key material to the KMS. The nonces may allow the KMS and/or HSM to verify the decrypted key material by comparing the decrypted nonces to the nonces that were originally generated and sent to the user.

In some embodiments, instead of directly encrypting the key material using the QSC public key, the QSC public key may be used to establish a common symmetric key between the KMS and the user. The QSC public key may be used to establish a key exchange mechanism (KEM) to establish a symmetric key. Then, the user may encrypt the key material using the symmetric key and the CC key to generate the hybrid-encrypted key material.

In a first example, a cloud KMS system receives a root key import request from a user system. The KMS generates a quantum-safe Kyber key pair dynamically in a crypto module of the KMS. Additionally, the KMS retrieves an RSA public key and a nonce generated within an HSM. The KMS sends the RSA public key, the Kyber public key, and the nonce to the user device. The user device creates an AES-GCM symmetrical key (key material) and encrypts the nonce using the key material. The user device encrypts the user's key material by first using the RSA public key to produce RSA-encrypted key material. Then, the user device encrypts the RSA encrypted key material with the Kyber public key to produce hybrid-encrypted key material. The user device sends the hybrid-encrypted key material and the encrypted nonce to the KMS. The KMS decrypts the hybrid-encrypted key material using its Kyber private key to produce the RSA-encrypted key material. The KMS sends the RSA-encrypted key material and the encrypted nonce to the HSM. The HSM decrypts the RSA-encrypted key material using its RSA private key to produce the key material. The HSM decrypts the encrypted nonce using the key material. The HSM verifies the nonce is the same as the original value generated inside the HSM to verify the key material. The HSM encrypts the key material with the master key encryption key (MKEK) of the HSM and the KMS stores this encrypted value in its database.

In a second example embodiment, a cloud KMS system receives a root key import request from a user system. The KMS retrieves an RSA public key, a Kyber public key, and a nonce generated within an HSM. The KMS sends the RSA public key, the Kyber public key, and the nonce to the user device. The user device creates an AES-GCM symmetrical key (key material) and encrypts the nonce using the key material. The user device splits the key material into two parts. The user device encrypts the first part of the user's key material using the RSA public key and encrypts the second part of the key material with the Kyber public key. The user device sends the encrypted first part of the key material, the encrypted second part of the key material, and the encrypted nonce to the KMS. The KMS sends the encrypted first part of the key material, the encrypted second part of the key material, and the encrypted nonce to the HSM. The HSM decrypts the first part of the key material using its RSA private key. The HSM decrypts the second part of the key material using its Kyber private key. The HSM concatenates the first part of the key material and the second part of the key material to produce the key material. The HSM decrypts the encrypted nonce using the key material. The HSM verifies the nonce is the same as the original value generated inside the HSM to verify the key material. The HSM encrypts the key material with the master key encryption key (MKEK) of the HSM and the KMS stores this encrypted value in its database.

Referring now to FIG. 1, a block diagram of an example computing environment 100 is depicted, according to embodiments. Computing environment 100 includes a Key Management Service (KMS) system 110 and a user system 120. KMS system 110 and user system 120 may be implemented using any suitable computing devices. In some embodiments, KMS system 110 may be implemented in a cloud computing environment. KMS system 110 and user system 120 may communicate over one or more networks.

KMS system 110 may include a key import module 112 and a hardware security module (HSM) 114. Key import module 112 may be configured to perform one or more operations to import key materials from user system 120. HSM 114 is a physical device that stores and manages keys. HSM 114 is configured to perform cryptographic operations such as key generation and encryption/decryption as discussed herein. In some embodiments, key import module 112 may also have a crypto module 113 configured to perform cryptographic operations such as key generation and encryption/decryption as discussed herein.

Figure 2:
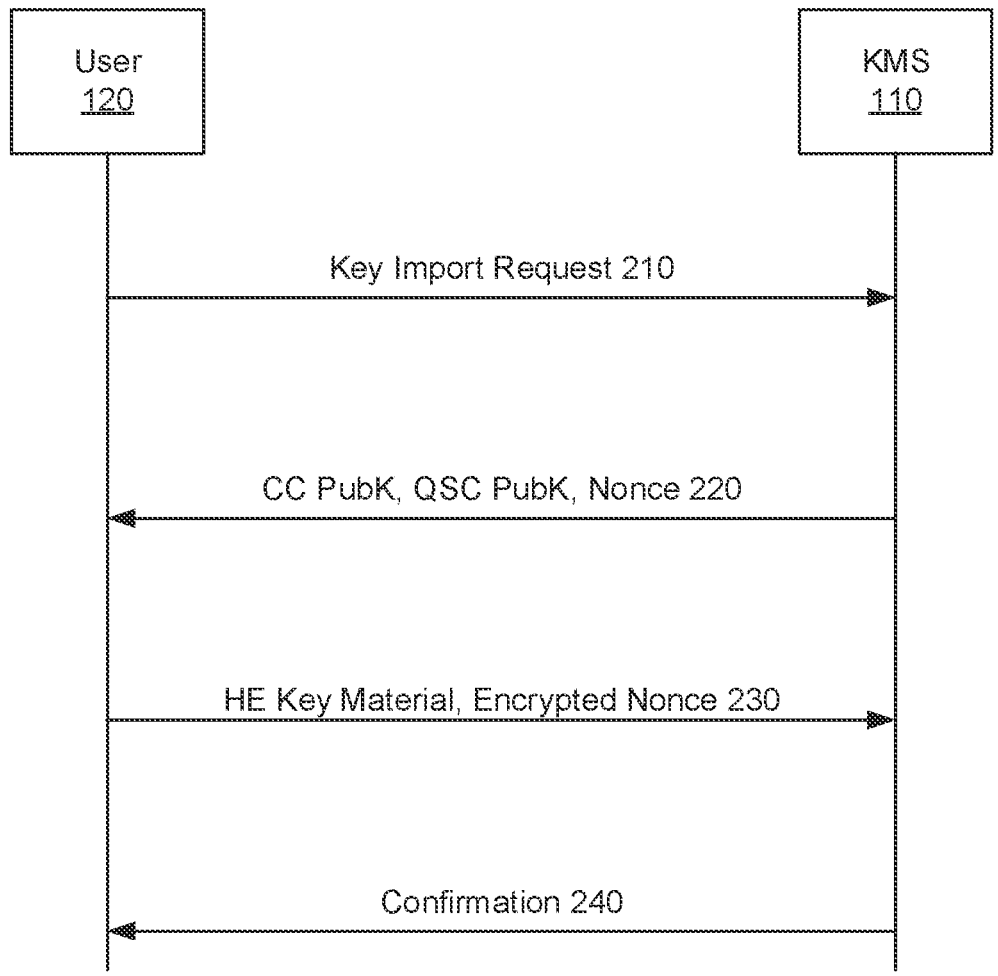
FIG. 2 depicts a sequence diagram of communication between user system and KMS system, according to embodiments.

Referring now to FIG. 2, a sequence diagram 200 of communication between user system 120 and KMS system 110 is depicted, according to embodiments. User system 120 may communicate a key import request to KMS system 110, per 210. KMS system 110 may communicate a CC public key, a QSC public key, and a nonce to user system 120, per 220. User system 120 may communicate hybrid-encrypted key material and a nonce encrypted with the key material to KMS system 110, per 230. KMS system 110 may confirm receipt of the key material to user system 120, per 240.

Figure 3:
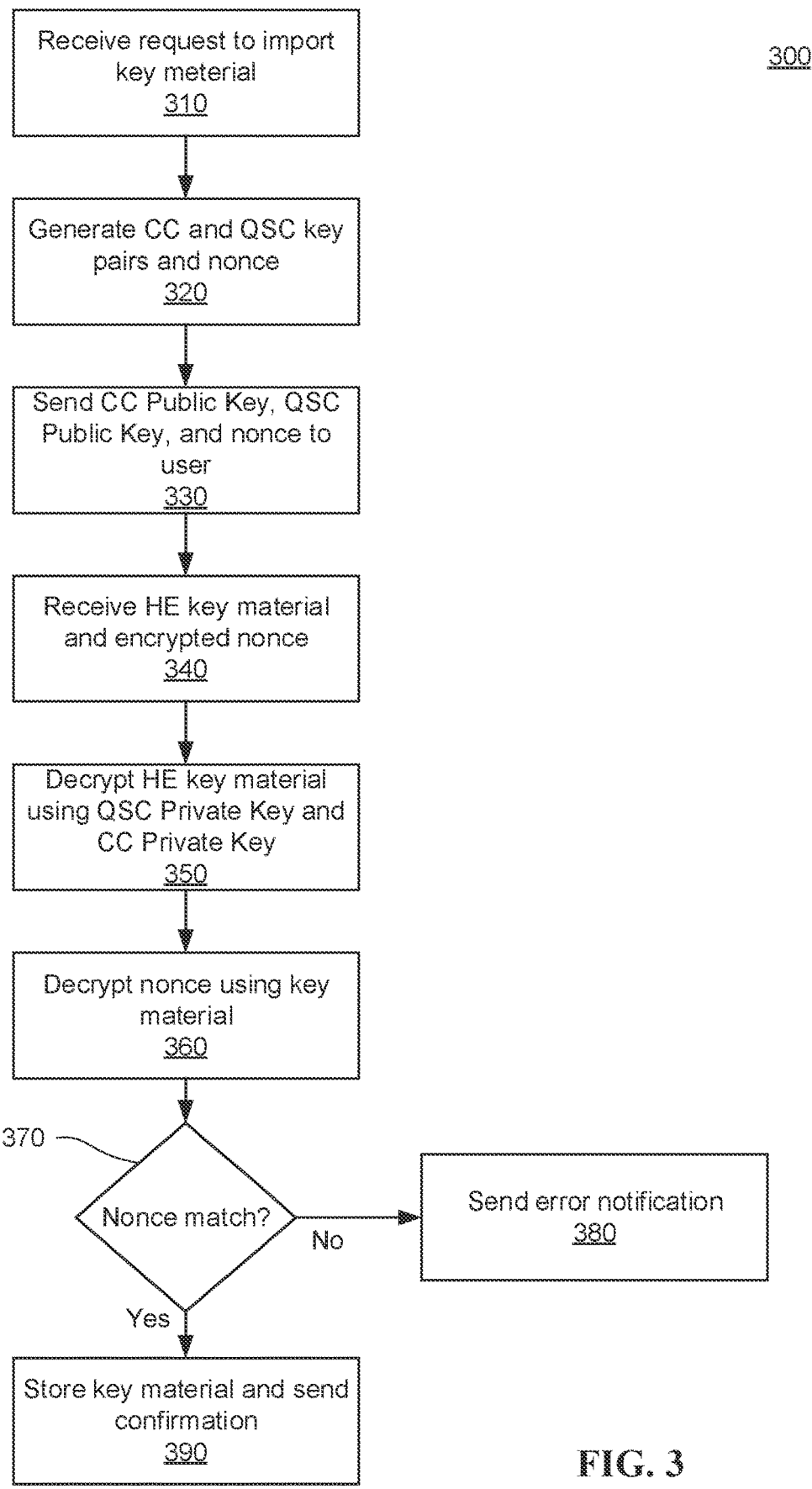
FIG. 3 depicts a flow diagram of an example method for importing key material from a user system by a KMS system, according to embodiments.

Referring now to FIG. 3, a flow diagram of an example method 300 for importing key material from a user system by a KMS system is depicted, according to embodiments. For example, method 300 may be performed by KMS system 110 in communication with user system 120.

At operation 310, a request to import key material may be received from a user system. In response to receiving the request, at operation 320, the KMS may generate CC and QSC key pairs and a nonce. One or more of the key pairs and the nonce may be generated within an HSM of the KMS. In some embodiments, the HSM generates both the CC key pair and the QSC key pair and the nonce. In some embodiments, the HSM generates one of the key pairs while a separate crypto module within the KMS generates the other key pair. For example, when the HSM does not support QSC, a crypto module within the KMS may generate the QSC key pair while the HSM generates the CC key pair.

At operation 330, the KMS may send the CC public key, QSC public key, and the nonce to the user system. The KMS may retrieve one or both of the public keys from its HSM for key pairs that were generated within the HSM. The KMS may further retrieve the nonce from the HSM.

At operation 340, the KMS may receive hybrid-encrypted key material and an encrypted nonce from the user system. The hybrid-encrypted key material may be key material that was generated by the user system and encrypted using both the CC public key and the QSC public key. The encrypted nonce may be encrypted by the user system using the key material. For example, the nonce may be encrypted using a symmetric encryption algorithm with the key material as a symmetrical key.

At operation 350, the KMS may decrypt the hybrid-encrypted key material using the QSC private key and the CC private key. Decrypting the encrypted key material may include sending the encrypted key material to the HSM to be decrypted within the HSM. In some embodiments, a crypto module of the KMS may apply decryption to some or all of the encrypted key material and send the result to the HSM for further decryption. For example, the crypto module may decrypt the hybrid-encrypted key material using the QSC private key to produce key material that remains encrypted by the CC public key, and this product may be sent to the HSM to be decrypted using the CC private key within the HSM.

As discussed herein, the hybrid-encrypted key material may be created by encrypting the entire key material with both the CC public key and the QSC public key or by encrypting part of the key material with the CC public key and some of the key material with the QSC public key. Thus, each decryption process may be applied to the entire encrypted key material or part of the key material as would correspond to the encryption process. When the parts of the key material are separately encrypted, each part may be decrypted and the results may be concatenated to produce the key material.

At operation 360, Once the key material has been decrypted, the KSM may then decrypt the encrypted nonce using the key material. The KSM may send the encrypted nonce to HSM to be decrypted within the HSM.

At operation 370, the KSM may determine whether the decrypted nonce matches the nonce that was originally generated and communicated to the user system. In some embodiments, this comparison takes place within the HSM.

If, at operation 370, the KSM determines that the nonces do not match, the KSM may send an error notification to the user system indicating that the key import failed at operation 380. If, at operation 370, the KSM determines that the nonces do match, the key material may be stored and a confirmation may be sent to the user system indicating that the key import was successful at operation 390. In some embodiments, the HSM may encrypt the key material using the HSM's master key and the KSM may store this encrypted key in a database.

Figure 4:
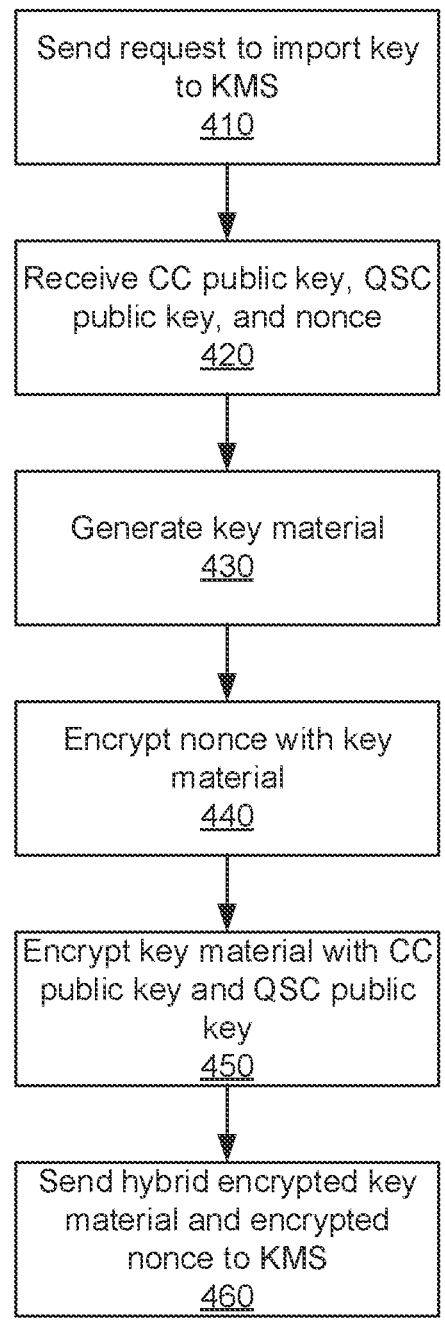
FIG. 4 depicts a flow diagram of an example method for exporting key material to a KMS system by a user system, according to embodiments.

Referring now to FIG. 4, a flow diagram of an example method 400 for exporting key material to a KMS system by a user system is depicted, according to embodiments. For example, method 400 may be performed by user system 120 in communication with KMS system 110.

At operation 410, a request to import a key is sent to the KMS. In response to the request, at operation 420, a CC public key, QSC public key, and a nonce may be received from the KMS.

At operation 430, key material is generated. The key material may be a symmetrical key. For example, an AES-GCM symmetrical key may be generated.

At operation 440, the nonce may be encrypted using the key material. For example, the AES-GCM symmetrical key may be used to encrypt the nonce.

At operation 450, the key material may be encrypted using the CC public key and QSC public key to generate hybrid-encrypted key material. In some embodiments, the entire key material is first encrypted using the CC public key, then that entire encrypted key material is encrypted with the QSC public key to generate hybrid-encrypted key material. In some embodiments, the key material is split into two parts and one part is encrypted with the CC public key and the other part is encrypted with the QSC public key.

At operation 460, the hybrid-encrypted key material and the encrypted nonce may be sent to the KMS.

Figure 5:
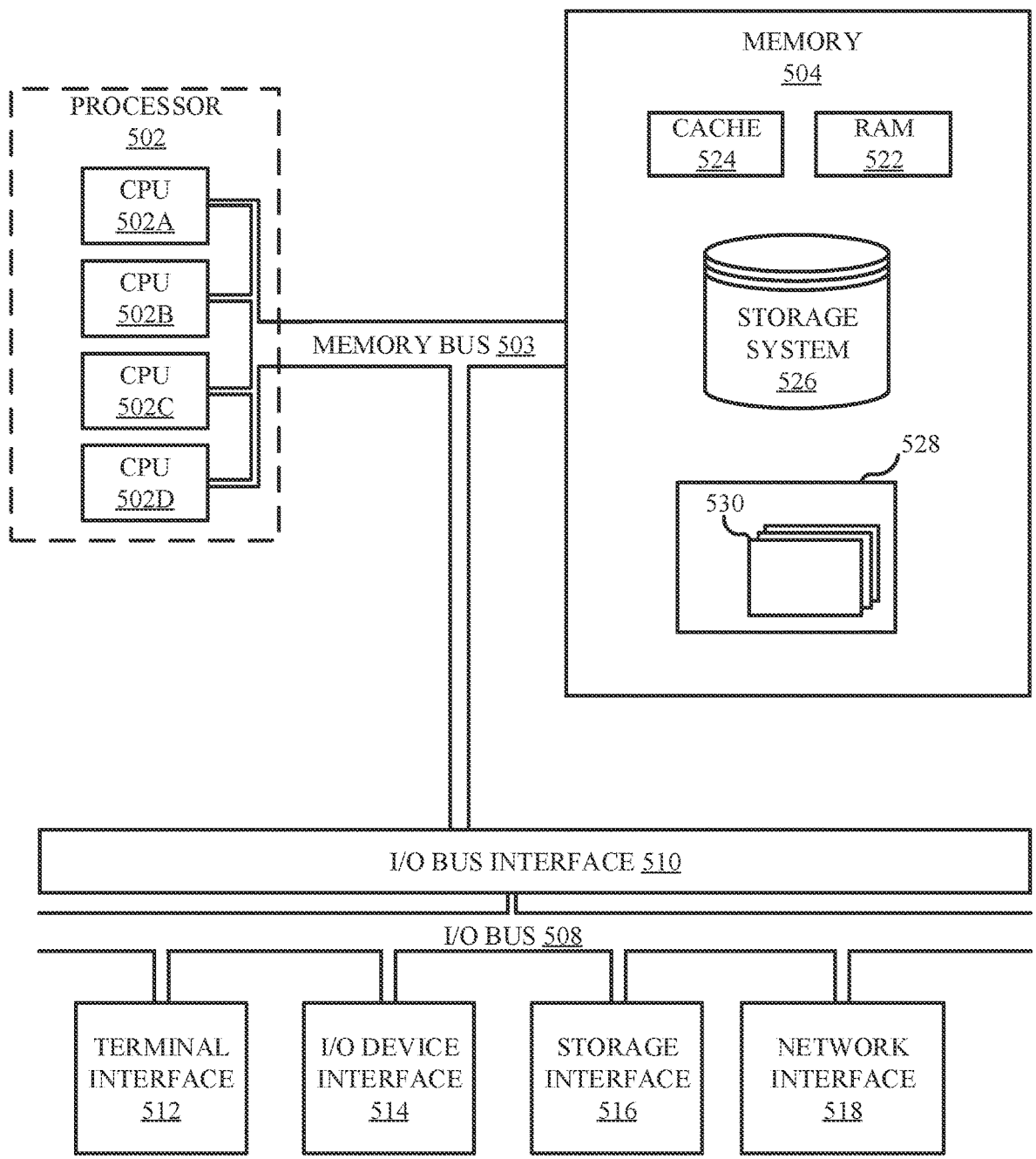
FIG. 5 depicts a block diagram of an example computer system, according to embodiments.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. For example, computer system 501 may be a user system such as user system 120 or may be a computing node in a cloud computing system such as a cloud KMS system. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
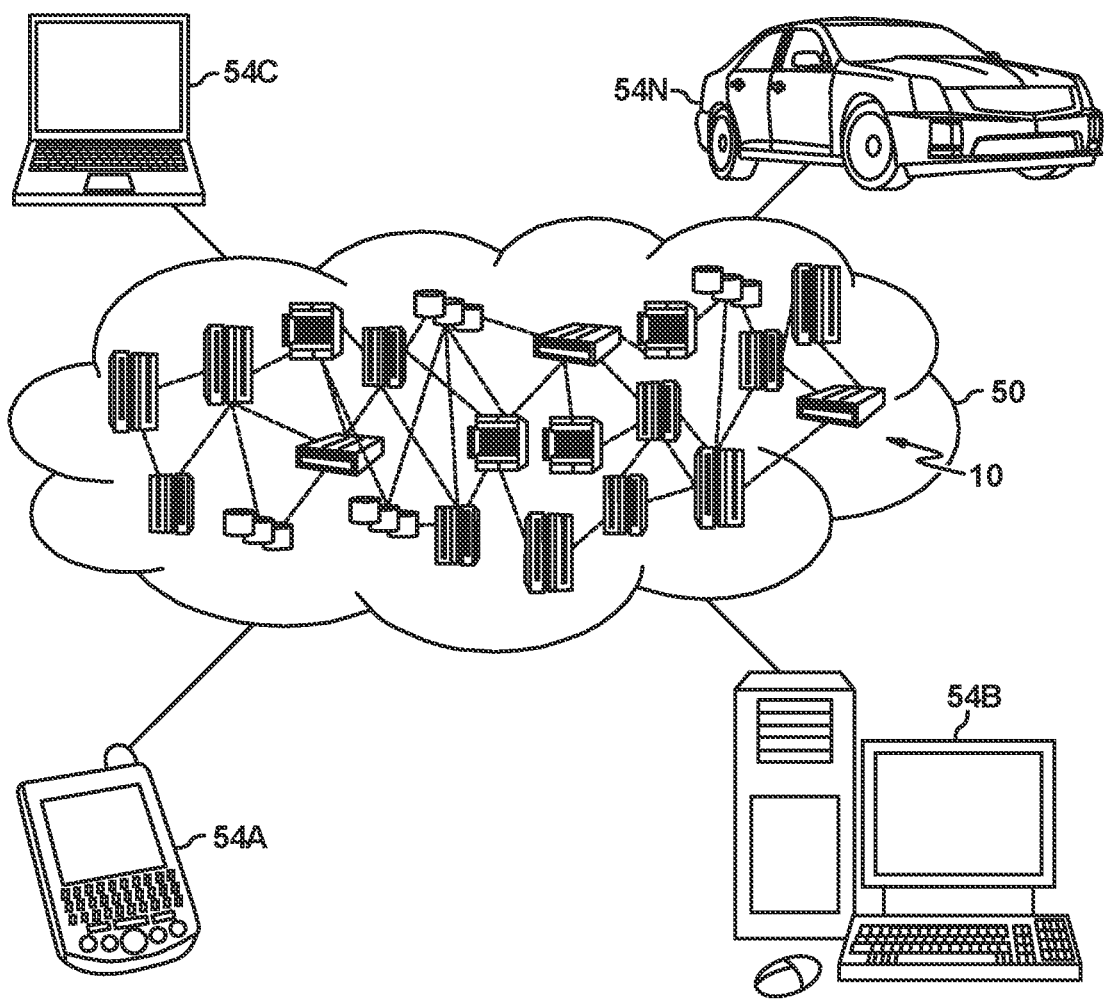
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
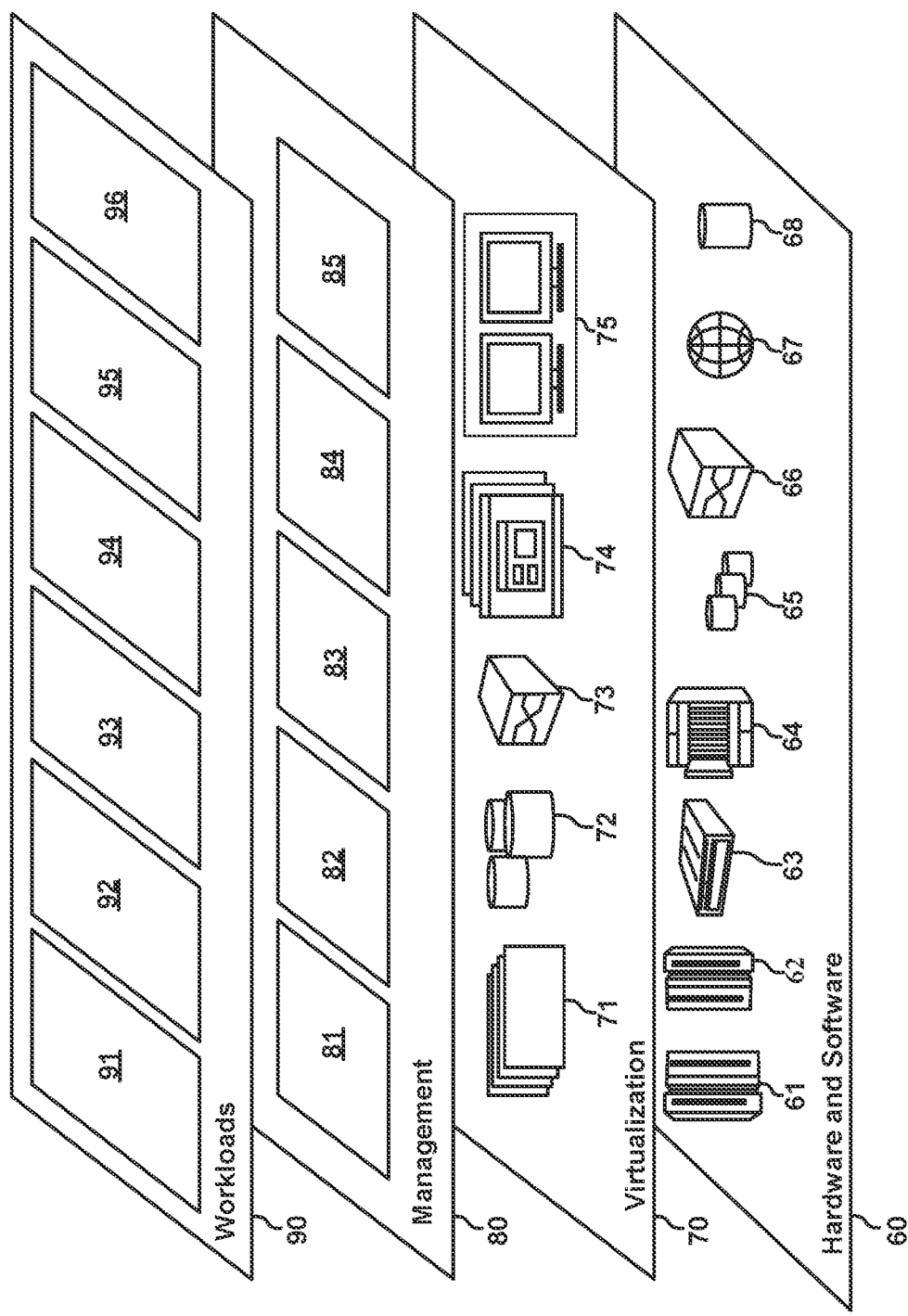
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and key import 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method comprising:
receiving, by a key management service (KMS) system, a request to import key material from a user system;
sending, by the KMS system and in response to the request, two public keys to the user system, the two public keys including a classical cryptography (CC) public key and a quantum-safe cryptography (QSC) public key, wherein at least one public key of the two public keys is retrieved from a hardware security module (HSM);

receiving, by the KMS system, hybrid-encrypted key material from the user system, wherein the hybrid-encrypted key material is key material that has been encrypted using the two public keys; and sending, by the KMS system, the key material, at least partially encrypted by the at least one public key, to the HSM.

2. The method of claim 1, further comprising:

generating a QSC key pair including the QSC public key and a QSC private key; and retrieving the CC public key from the HSM.

3. The method of claim 2, wherein the hybrid-encrypted key material includes a first part encrypted using the QSC public key and a second part encrypted using the CC public key, the method further comprising:

decrypting the first part using the QSC private key, wherein the key material sent to the HSM is the decrypted first part and the encrypted second part.

4. The method of claim 2, further comprising:

decrypting all of the hybrid-encrypted key material using the QSC private key to produce key material encrypted by the CC public key, wherein the key material sent to the HSM is the key material encrypted by the CC public key.

5. The method of claim 1, wherein the QSC public key is used to establish a symmetric key, and wherein the hybrid-encrypted key material is encrypted by the symmetric key and the CC public key.

6. The method of claim 1, further comprising:

retrieving the QSC public key and the CC public key from the HSM, wherein the sending the key material to the HSM includes sending the hybrid-encrypted key material to the HSM for decryption.

7. The method of claim 1, wherein the at least one public key is the CC public key and the QSC public key, the method further comprising:

generating, by the HSM, a CC key pair and a QSC key pair, the CC key pair including the CC public key and a corresponding CC private key, the QSC key pair including the QSC public key and a corresponding QSC private key; and decrypting, by the HSM, the hybrid-encrypted key material using the CC private key and the QSC private key to produce the key material.

8. A system comprising:

a hardware security module (HSM); and a key import module configured to:

receive a request to import key material from a user system;

send, in response to the request, two public keys to the user system, the two public keys including a classical cryptography (CC) public key and a quantum-safe cryptography (QSC) public key, wherein at least one public key of the two public keys is retrieved from the HSM;

receive hybrid-encrypted key material from the user system, wherein the hybrid-encrypted key material is key material that has been encrypted using the two public keys; and send the key material, at least partially encrypted by the at least one public key, to the HSM.

9. The system of claim 8, wherein:

the key import module is configured to:

generate a QSC key pair including the QSC public key and a QSC private key, retrieve the CC public key from the HSM, at least partially decrypt the hybrid-encrypted key material using the QSC private key to produce key material that is at least partially encrypted by the CC public key, and the HSM is configured to:

generate a CC key pair including the CC public key and a CC private key, and decrypt the key material that is at least partially encrypted by the CC public key with the CC private key to produce the key material.

10. The system of claim 9, wherein:

the key import module is configured to decrypt a first part of the hybrid-encrypted key material to produce a first part of the key material, and the HSM is configured to:

decrypt a second part of the hybrid-encrypted key material to produce a second part of the key material, and concatenate the first part of the key material and the second part of the key material to produce the key material.

11. The system of claim 9, wherein:

the key import module is configured to decrypt all of the hybrid-encrypted key material to produce key material encrypted by the CC public key, and the HSM is configured to decrypt the key material encrypted by the CC public key using the CC private key to produce the key material.

12. The system of claim 8, wherein the QSC public key is used to establish a symmetric key, and wherein the hybrid-encrypted key material is encrypted by the symmetric key and the CC public key.

13. The system of claim 8, wherein:

the key import module is configured to send the hybrid-encrypted key material to the HSM, and the HSM is configured to:

generate a CC key pair and a QSC key pair, the CC key pair including the CC public key and a corresponding CC private key, the QSC key pair including the QSC public key and a corresponding QSC private key; and decrypt the hybrid-encrypted key material using the CC private key and the QSC private key to produce the key material.

14. A computer program product comprising one or more computer readable storage media having program instructions embodied therewith, the program instructions executable by one or more processors to cause the one or more processors to perform operations comprising:

receiving, by a key management service (KMS) system, a request to import key material from a user system;

sending, by the KMS system and in response to the request, two public keys to the user system, the two public keys including a classical cryptography (CC) public key and a quantum-safe cryptography (QSC) public key, wherein at least one public key of the two public keys is retrieved from a hardware security module (HSM);

receiving, by the KMS system, hybrid-encrypted key material from the user system, wherein the hybrid-encrypted key material is key material that has been encrypted using the two public keys; and sending, by the KMS system, the key material, at least partially encrypted by the at least one public key, to the HSM.

15. The computer program product of claim 14, wherein the operations further comprise:
   generating a QSC key pair including the QSC public key and a QSC private key; and
   retrieving the CC public key from the HSM.

16. The computer program product of claim 15, wherein the hybrid-encrypted key material includes a first part encrypted using the QSC public key and a second part encrypted using the CC public key, and wherein the operations further comprise:
   decrypting the first part using the QSC private key, wherein the key material sent to the HSM is the decrypted first part and the encrypted second part.

17. The computer program product of claim 15, wherein the operations further comprise:
   decrypting all of the hybrid-encrypted key material using the QSC private key to produce key material encrypted by the CC public key, wherein the key material sent to the HSM is the key material encrypted by the CC public key.

18. The computer program product of claim 14, wherein the QSC public key is used to establish a symmetric key, and wherein the hybrid-encrypted key material is encrypted by the symmetric key and the CC public key.

19. The computer program product of claim 14, wherein the operations further comprise:
   retrieving the QSC public key and the CC public key from the HSM, wherein the sending the key material to the HSM includes sending the hybrid-encrypted key material to the HSM for decryption.

* * * * *